US009725111B2

(12) United States Patent
Maehara et al.

(10) Patent No.: US 9,725,111 B2
(45) Date of Patent: Aug. 8, 2017

(54) ELECTRIC POWER STEERING DEVICE AND ADJUSTING DEVICE AND ADJUSTING METHOD OF ELECTRIC POWER STEERING DEVICE

(71) Applicant: KAYABA INDUSTRY CO., LTD., Minato-ku, Tokyo (JP)

(72) Inventors: Hideo Maehara, Gifu (JP); Ryota Yamada, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/771,503

(22) PCT Filed: Feb. 24, 2014

(86) PCT No.: PCT/JP2014/054306
§ 371 (c)(1),
(2) Date: Aug. 31, 2015

(87) PCT Pub. No.: WO2014/132916
PCT Pub. Date: Sep. 4, 2014

(65) Prior Publication Data
US 2016/0016605 A1 Jan. 21, 2016

(30) Foreign Application Priority Data
Mar. 1, 2013 (JP) ................................ 2013-040969

(51) Int. Cl.
*B62D 5/04* (2006.01)
*G01L 5/22* (2006.01)
*G01L 25/00* (2006.01)

(52) U.S. Cl.
CPC ......... *B62D 5/0463* (2013.01); *B62D 5/0421* (2013.01); *G01L 5/221* (2013.01); *G01L 25/003* (2013.01)

(58) Field of Classification Search
CPC ....... B62D 5/04–5/0496; G01L 25/003; G01L 5/221
See application file for complete search history.

(56) References Cited

U.S. PATENT DOCUMENTS

| 5,743,351 A * | 4/1998 | McLaughlin ........... H02P 25/08 180/446 |
| 2009/0294208 A1* | 12/2009 | Nishimura ........... B62D 5/0463 180/446 |
| 2013/0090811 A1 | 4/2013 | Maehara |

FOREIGN PATENT DOCUMENTS

JP 2012-106673 A 6/2012

OTHER PUBLICATIONS

International Search Report and Written Opinion mailed Mar. 25, 2014 for PCT/JP2014/054306.

* cited by examiner

*Primary Examiner* — Genna Mott
(74) *Attorney, Agent, or Firm* — Hauptman Ham, LLP

(57) ABSTRACT

Output signals of a torque sensor include a first output signal used in an assist control and a second output signal used in controls other than the assist control. An adjusting device of an electric power steering device includes an input torque meter for measuring an input torque applied to the input shaft, an output torque meter for measuring an output torque output by the steering mechanism, and a sensor output corrector for correcting an output signal of the torque sensor. The sensor output corrector corrects the first output signal so that a relationship between the input torque measured by the input torque meter and the output torque measured by the output torque meter becomes an ideal characteristic set in advance, and corrects the second output signal so that an input torque detected by the torque sensor coincides with the input torque measured by the input torque meter.

6 Claims, 12 Drawing Sheets

ELECTRIC POWER STEERING DEVICE AND ADJUSTING DEVICE AND ADJUSTING METHOD OF ELECTRIC POWER STEERING DEVICE

TECHNICAL FIELD

The present invention relates to an electric power steering device and an adjusting device and an adjusting method of the electric power steering device.

BACKGROUND ART

JP2012-106673A discloses an adjusting device of an electric power steering device for adjusting an output characteristic of a sensor circuit of a torque sensor to bring a steering force closer to an ideal value in accordance with a deviation amount calculated on the basis of a difference between the steering force measured by a steering force meter and the ideal value set in advance.

SUMMARY OF INVENTION

Torque information based on an output signal of the torque sensor may be used also in controls other than an assist control inside and outside the electric power steering device.

Since the adjusting device described in JP2012-106673A is designed to correct an output signal of the torque sensor, the output signal of the torque sensor does not correctly reflect an actual input torque. Thus, in the case of using a corrected output signal in a control other than the assist control, the accuracy of the control other than the assist control may be reduced.

The present invention aims to enhance the accuracy of both an assist control and controls other than the assist control.

According to one aspect of the present invention, an electric power steering device includes a torque sensor configured to output an output signal corresponding to an input torque applied to an input shaft from a steering wheel; a steering mechanism that transmits the input torque to wheels; an electric motor configured to apply an assist torque to the steering mechanism; and a controller configured to control an output of the electric motor in accordance with an output signal output from the torque sensor. The output signals of the torque sensor include a first output signal used in an assist control and a second output signal used in controls other than the assist control. The first output signal is so corrected that a relationship between an input torque measured by an input torque meter for measuring an input torque applied to the input shaft and an output torque output by the steering mechanism becomes an ideal characteristic set in advance, and the second output signal is so corrected that an input torque detected by the torque sensor coincides with the input torque measured by the input torque meter.

According to another aspect of the present invention, an electric power steering device includes a torque sensor configured to output an output signal corresponding to an input torque applied to an input shaft from a steering wheel, a steering mechanism that transmits the input torque to wheels, an electric motor configured to apply an assist torque to the steering mechanism, and a controller configured to control an output of the electric motor in accordance with an output signal output from the torque sensor. The output signals of the torque sensor include a first output signal used in an assist control and a second output signal used in controls other than the assist control. An adjusting device of the electric power steering device includes an input torque meter configured to measure an input torque applied to the input shaft, an output torque meter configured to measure an output torque output by the steering mechanism, and a sensor output corrector configured to correct an output signal of the torque sensor. The sensor output corrector corrects the first output signal so that a relationship between the input torque measured by the input torque meter and the output torque measured by the output torque meter becomes an ideal characteristic set in advance, and corrects the second output signal so that an input torque detected by the torque sensor coincides with the input torque measured by the input torque meter.

According to another aspect of the present invention, an electric power steering device includes a torque sensor configured to output an output signal corresponding to an input torque applied to an input shaft from a steering wheel, a steering mechanism that transmits the input torque to wheels, an electric motor configured to apply an assist torque to the steering mechanism, and a controller configured to control an output of the electric motor in accordance with an output signal output from the torque sensor. The output signals of the torque sensor include a first output signal used in an assist control and a second output signal used in controls other than the assist control. An adjusting method of an electric power steering device includes an input torque measuring step of measuring an input torque applied to the input shaft, an output torque measuring step of measuring an output torque output by the steering mechanism, a first sensor output correcting step of correcting the first output signal so that a relationship between an input torque measured in the input torque measuring step and an output torque measured in the output torque measuring step becomes an ideal characteristic set in advance, and a second sensor output correcting step of correcting the second output signal so that an input torque detected by the torque sensor coincides with the input torque measured in the input torque measuring step.

DESCRIPTION OF EMBODIMENTS

Hereinafter, embodiments of the present invention are described with reference to the drawings.

<First Embodiment>

Figure 1:
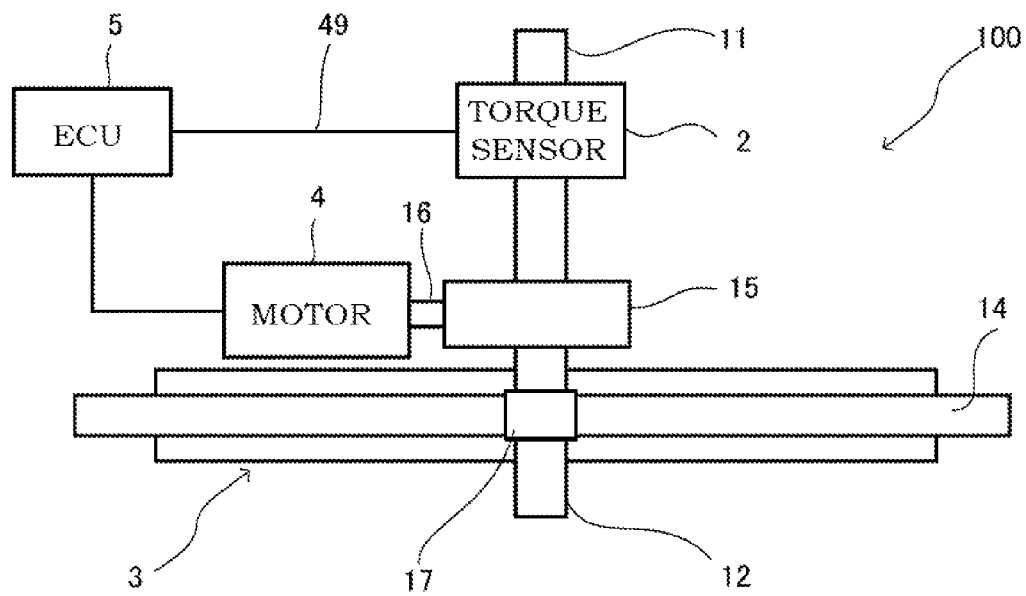
FIG. 1 is a schematic configuration diagram of an electric power steering device according to a first embodiment of the present invention.

First, an electric power steering device 100 according to a first embodiment of the present invention is described with reference to FIG. 1.

The electric power steering device 100 includes a torque sensor 2 for outputting an output signal corresponding to an input torque applied to an input shaft 11 from a steering wheel, a steering mechanism 3 for transmitting the input torque to wheels, an electric motor 4 for applying an assist torque to the steering mechanism 3, and a controller 5 for controlling an output of the electric motor 4 in accordance with the output signal output from the torque sensor 2.

The steering mechanism 3 is designed to steer the wheels via tie rods (not shown) coupled to a rack 14 by moving the rack 14 meshed with a pinion 17 formed on an output shaft 12 in an axial direction (lateral direction of a vehicle) through the rotation of the input shaft 11 and the output shaft 12 according to the steering of the steering wheel by a driver.

The steering mechanism 3 includes a worm wheel 15 coupled to the output shaft 12 and a worm 16 meshed with the worm wheel 15. The electric motor 4 applies the assist torque to the output shaft 12 via the worm wheel 15 by rotationally driving the worm 16.

The torque sensor 2 is a non-contact type sensor for detecting an input torque acting on a torsion bar 21 coupling the input shaft 11 and the output shaft 12.

Figure 2:
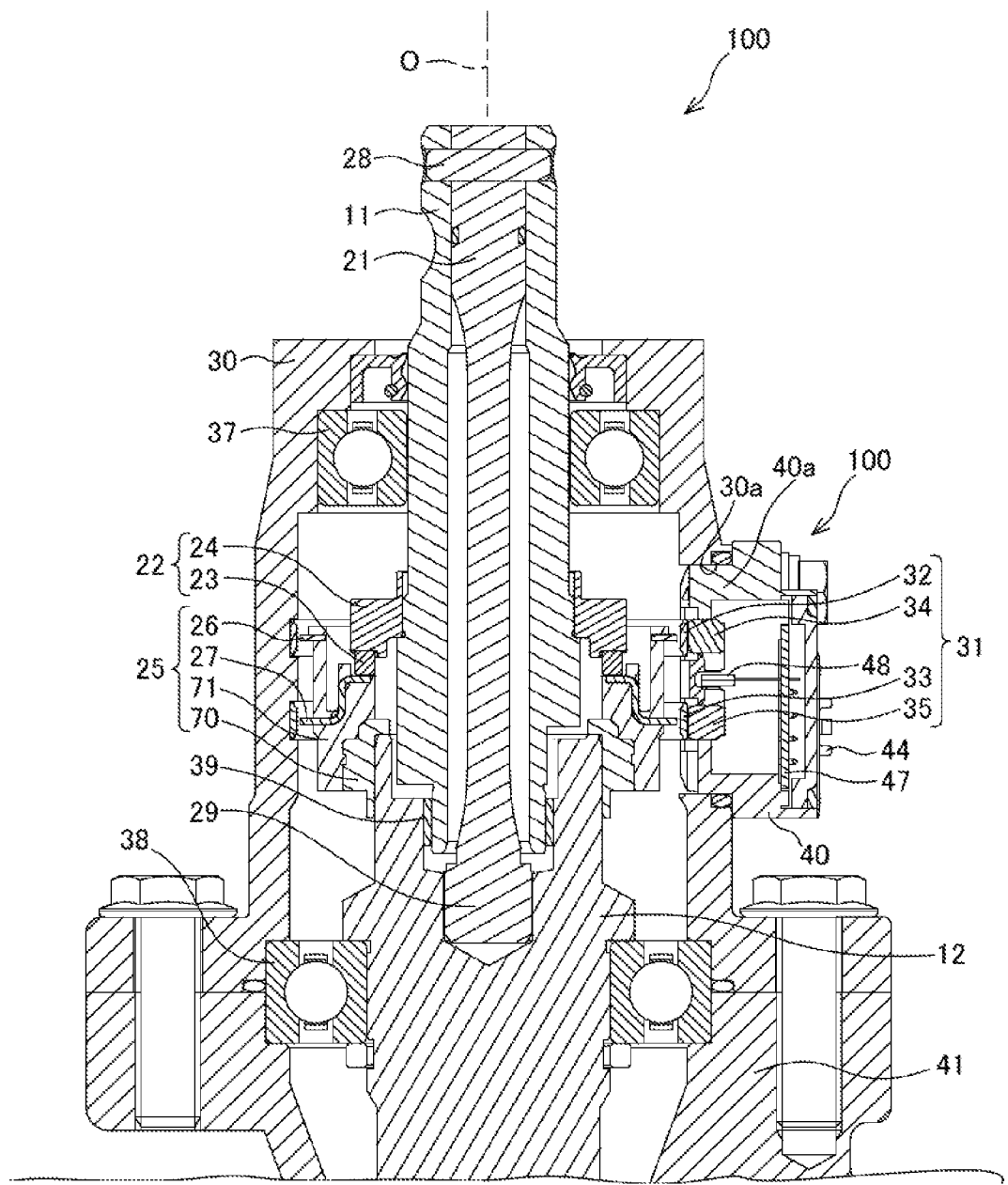
FIG. 2 is a partial sectional view of the electric power steering device according to the first embodiment of the present invention.

The electric power steering device 100 and the torque sensor 2 are described in detail with reference to FIG. 2.

The input shaft 11 is rotatably supported in a housing 30 via a rolling bearing 37. The output shaft 12 is rotatably supported in a housing 41 via a rolling bearing 38. A sliding bearing 39 is interposed between a lower end side of the input shaft 11 and an upper end side of the output shaft 12. The input shaft 11 and the output shaft 12 are coaxially rotatably supported in the housings 30, 41.

The input shaft 11 is formed into a cylindrical shape and the torsion bar 21 is coaxially housed in the input shaft 11. An upper end part of the torsion bar 21 is coupled to an upper end part of the input shaft 11 via a pin 28. A lower end part of the torsion bar 21 projects from a lower end opening of the input shaft 11 and is coupled to the output shaft 12 via serration 29. The torsion bar 21 transmits an input torque input to the input shaft 11 from the steering wheel to the output shaft 12 and is twisted and deformed about an axis of rotation O in accordance with the input torque.

The torque sensor 2 includes a magnetic generator 22 fixed to the input shaft 11 and configured to rotate together with the input shaft 11, a rotating magnetic circuit unit 25 fixed to the output shaft 12 and configured to rotate together with the output shaft 12, a fixed magnetic circuit unit 31 fixed to the housing 30, and magnetic sensors 48 configured to detect a magnetic flux density introduced to the fixed magnetic circuit unit 31 through the rotating magnetic circuit unit 25 from the magnetic generator 22 as the torsion bar 21 is twisted and deformed. The torque sensor 2 detects the input torque acting on the torsion bar 21 on the basis of outputs of the magnetic sensors 48.

Instead of the above configuration, the magnetic generator 22 may be fixed to the output shaft 12 to rotate together with the output shaft 12 and the rotating magnetic circuit unit 25 may be fixed to the input shaft 11 to rotate together with the input shaft 11.

The magnetic generator 22 includes an annular back yoke 24 press-fitted to the input shaft 11 and an annular ring magnet 23 bonded to the lower end surface of the back yoke 24.

The ring magnet 23 is an annular permanent magnet for generating magnetism in the direction of the axis of rotation O of the input shaft 11. The ring magnet 23 is a multi-pole magnet formed by magnetizing a hard magnetic body in the direction of the axis of rotation O and includes twelve magnetic poles formed to have an equal width in a circumferential direction. That is, six N-poles and six S-poles are alternately arranged in the circumferential direction on the upper and lower end surfaces of the ring magnet 23. The number of the magnetic poles formed on the end surface of the ring magnet 23 is arbitrarily set in a range of two or more.

The upper end surface of the ring magnet 23 is fixed to the lower end surface of the back yoke 24 via an adhesive. Further, since the back yoke 24 is formed of a soft magnetic body, it is magnetized by a magnetic force generated by the ring magnet 23 and attracted to the ring magnet 23. As just described, the ring magnet 23 and the back yoke 24 are bonded by an adhesive force of the adhesive and a magnetic force.

The rotating magnetic circuit unit 25 includes a first soft magnetic ring 26 and a second soft magnetic ring 27 to which a magnetic flux generated from the ring magnet 23 of the magnetic generator 22 is introduced, a mounting member 70 which is mounted on the output shaft 12, and molding resin 71 which fixes the first and second soft magnetic rings 26, 27 to the mounting member 70.

Each of the first and second soft magnetic rings 26, 27 includes six magnetic path tip portions facing the lower end surface of the ring magnet 23, six magnetic path column portions bent from the magnetic path tip portions and extending in directions away from each other and a magnetic path annular portion annularly extending while connecting the magnetic path column portions. The structure of the first and second soft magnetic rings 26, 27 is proposed in JP2009-244205A by the present applicant.

The fixed magnetic circuit unit 31 includes a first magnetism collecting ring 32 and a second magnetism collecting ring 33 having an annular shape and fixed to the housing 30 and a first magnetism collecting yoke 34 and a second magnetism collecting yoke 35 fixed to a sensor holder 40.

The first and second magnetism collecting rings 32, 33 are so arranged that the inner peripheral surfaces thereof face the magnetic path annular portions of the first and second soft magnetic rings 26, 27.

The first and second magnetism collecting yokes 34, 35 are respectively arranged to face the outer peripheral surfaces of the first and second magnetism collecting rings 32, 33. A pair of magnetic gaps (clearances) arranged in the circumferential direction are formed between the first and second magnetism collecting yokes 34, 35. Main and sub-magnetic sensors 48 are disposed side by side in the pair of magnetic gaps. Each magnetic sensor 48 is fixed to the sensor holder 40 via resin molding.

The magnetic sensor 48 outputs a voltage corresponding to the size and direction of a magnetic field of the magnetic gap through a board 47 and a terminal 44. The terminal 44 is connected to the controller 5 via a wiring 49 (see FIG. 5) connected to the sensor holder 40.

The first magnetism collecting yoke 34, the second magnetism collecting yoke 35, the magnetic sensors 48 and the board 47 are fixed to the sensor holder 40 made of resin via mold resin. The sensor holder 40 has a hollow cylindrical portion 40*a* fitted and inserted into an opening 30*a* of the housing 30 and is mounted on the housing 30 made of metal via a bolt.

Next, a detecting method of an input torque acting on the torsion bar 21 by the torque sensor 2 is described.

In a neutral state where no input torque acts on the torsion bar 21, the magnetic path tip portions of the first and second soft magnetic rings 26, 27 magnetically short the N- and S-poles of the ring magnet 23 by facing the N- and S-poles with the same area. Thus, a magnetic flux is not introduced to the rotating magnetic circuit unit 25 and the fixed magnetic circuit unit 31.

If an input torque of a specific direction acts on the torsion bar 21 by the operation of the steering wheel by the driver, the torsion bar 21 is twisted and deformed in accordance with the direction of this input torque. If the torsion bar 21 is twisted and deformed, the magnetic path tip portions of the first soft magnetic ring 26 face the N-poles with a larger area than they face the S-poles, whereas the magnetic path tip portions of the second soft magnetic ring 27 face the S-poles with a larger area than they face the N-poles. The magnetic flux from the ring magnet 23 is introduced to the fixed magnetic circuit unit 31 through the rotating magnetic circuit unit 25. Specifically, the magnetic flux is introduced in a route from the N-poles toward the S-poles by way of the first soft magnetic ring 26, the first magnetism collecting ring 32, the first magnetism collecting yoke 34, the second magnetism collecting yoke 35, the second magnetism collecting ring 33 and the second soft magnetic ring 27. The magnetic sensors 48 disposed in the magnetic gaps between the first and second magnetism collecting yokes 34, 35 output voltage values corresponding to the size and direction of the magnetic flux.

On the other hand, if an input torque of a direction opposite to the above case acts on the torsion bar 21 by the operation of the steering wheel by the driver, the torsion bar 21 is twisted and deformed in accordance with the direction of this input torque. If the torsion bar 21 is twisted and deformed, the magnetic path tip portions of the first soft magnetic ring 26 face the S-poles with a larger area than they face the N-poles, whereas the magnetic path tip portions of the second soft magnetic ring 27 face the N-poles with a larger area than they face the S-poles. The magnetic flux from the ring magnet 23 is introduced to the fixed magnetic circuit unit 31 through the rotating magnetic circuit unit 25 and a route thereof is opposite to the above case. Specifically, the magnetic flux is introduced in a route from the N-poles toward the S-poles by way of the second soft magnetic ring 27, the second magnetism collecting ring 33, the second magnetism collecting yoke 35, the first magnetism collecting yoke 34, the first magnetism collecting ring 32 and the first soft magnetic ring 26. The magnetic sensors 48 disposed in the magnetic gaps between the first and second magnetism collecting yokes 34, 35 output voltage values corresponding to the size and direction of the magnetic flux.

The larger an area difference between the area of the magnetic path tip portions of the first and second soft magnetic rings 26, 27 facing the N-poles of the ring magnet 23 and that of the magnetic path tip portions of the first and second soft magnetic rings 26, 27 facing the S-poles, the larger the magnetic flux introduced to the magnetic gaps and the larger the output voltages of the magnetic sensors 48. Thus, by increasing the number of the magnetic poles of the ring magnet 23, the magnetic flux density introduced to the magnetic sensors 48 can be enhanced.

The magnetic sensor 48 includes an output unit for outputting a voltage corresponding to the size and direction of a magnetic field, and an adjusting unit capable of adjusting an output characteristic of an output voltage (output signal) output by the output unit. The output unit is formed by a Hall element.

The adjusting unit of the magnetic sensor 48 includes an amplifying unit for amplifying the output voltage output by the output unit on the basis of a set output amplification factor (gain), and an offset unit for adding a set offset value to the output voltage output by the output unit. Processing contents of the amplifying unit and the offset unit are described in detail later.

Figure 3:
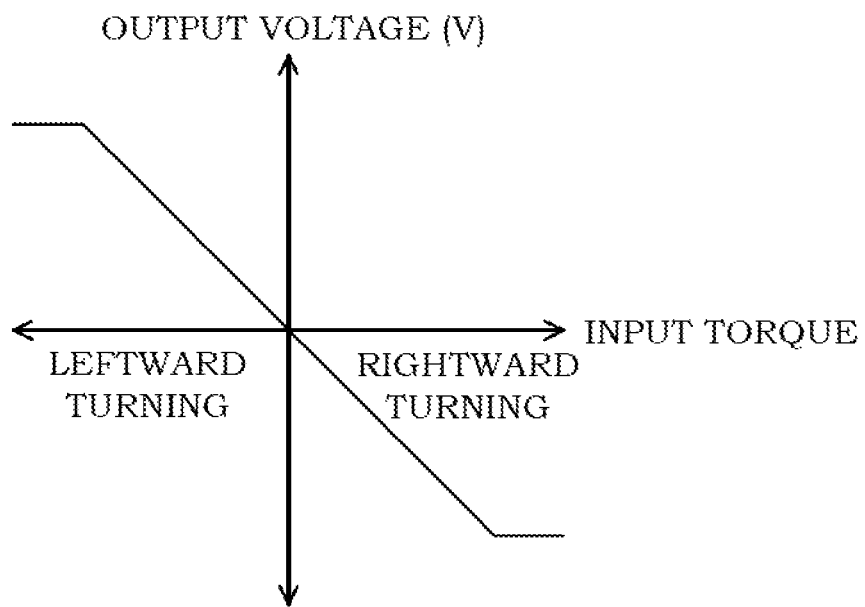
FIG. 3 is an output characteristic diagram of a main sensor showing a relationship between an input torque and an output voltage.
Figure 4:
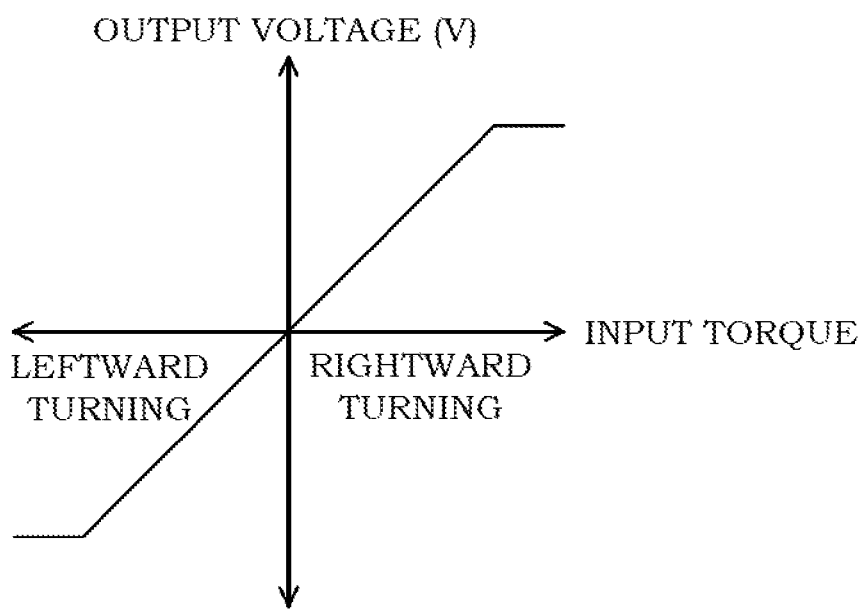
FIG. 4 is an output characteristic diagram of a sub-sensor showing a relationship between an input torque and an output voltage.

FIGS. 3 and 4 are respectively output characteristic diagrams of the main and sub-magnetic sensors 48 showing a relationship between the input torque acting on the torsion bar 21 and the output voltage of the magnetic sensor 48. The main magnetic sensor 48 is referred to as a "main sensor" and the sub-magnetic sensor 48 is referred to as a "sub-sensor" below.

The main sensor has such a characteristic that the output voltage (output signal) becomes zero when the steering wheel is not steered (input torque is zero) and the output voltage increases with an increase in the input torque when the steering wheel is steered in a leftward turning direction, whereas the output voltage decreases with an increase in the input torque when the steering wheel is steered in a rightward turning direction.

The sub-sensor has such a characteristic that the output voltage (output signal) becomes zero when the steering wheel is not steered (input torque is zero) and the output voltage decreases with an increase in the input torque when the steering wheel is steered in the leftward turning direction, whereas the output voltage increases with an increase in the input torque when the steering wheel is steered in the rightward turning direction.

A change rate (gradient) of the output voltage can be changed by changing the output amplification factor set in the amplifying unit in the adjusting unit of the magnetic sensor 48, and the output voltage can be offset in the leftward or rightward turning direction by changing the offset value set in the offset unit.

As is understood from FIGS. 3 and 4, the main and sub-sensors have output characteristics opposite to each other and output voltage values having mutually opposite characteristics in response to the input torque acting on the torsion bar 21. The output signal of the main sensor is used in an assist control for assisting the steering of the steering wheel by the driver.

The controller 5 determines whether or not there is any abnormality in the magnetic sensors 48 by comparing the output voltages of the main and sub-sensors with each other. As just described, the sub-sensor is provided to determine an abnormality in the magnetic sensors 48. Further, the output signal of the sub-sensor is also used in controls other than the assist control. The controls other than the assist control specifically include a control for maintaining the traveling safety of the vehicle, a flutter suppression control and the like.

Here, thrusts of the rack 14 for steering the wheels when the steering wheel is turned leftward and when the steering wheel is turned rightward are asymmetric due to an output variation caused by a difference in a rotating direction of the electric motor 4, a frictional force variation caused by a difference in the turning direction of the steering wheel and the like. A degree of asymmetry between leftward turning and rightward turning differs in the individual electric power steering device 100. Accordingly, the output signal of the torque sensor 2 of the individual electric power steering device 100 is corrected to make the thrusts of the rack 14 symmetric between leftward turning and rightward turning.

If the output signal of the torque sensor 2 is so corrected that the thrusts of the rack 14 are symmetric between leftward turning and rightward turning, the output signal of the torque sensor 2 does not correctly reflect an actual input torque. Accordingly, if the corrected output signal of the torque sensor 2 is used in a control other than the assist control executed using torque information based on the output signal of the torque sensor 2, control accuracy may be reduced. Thus, the output signal of the main sensor used in the assist control and that of the sub-sensor used in the controls other than the assist control are differently corrected in accordance with each purpose.

An adjusting device 50 for adjusting the electric power steering device 100 by correcting the output signals of the main sensor and the sub-sensor is described below with reference to FIGS. 5 and 6.

Figure 5:
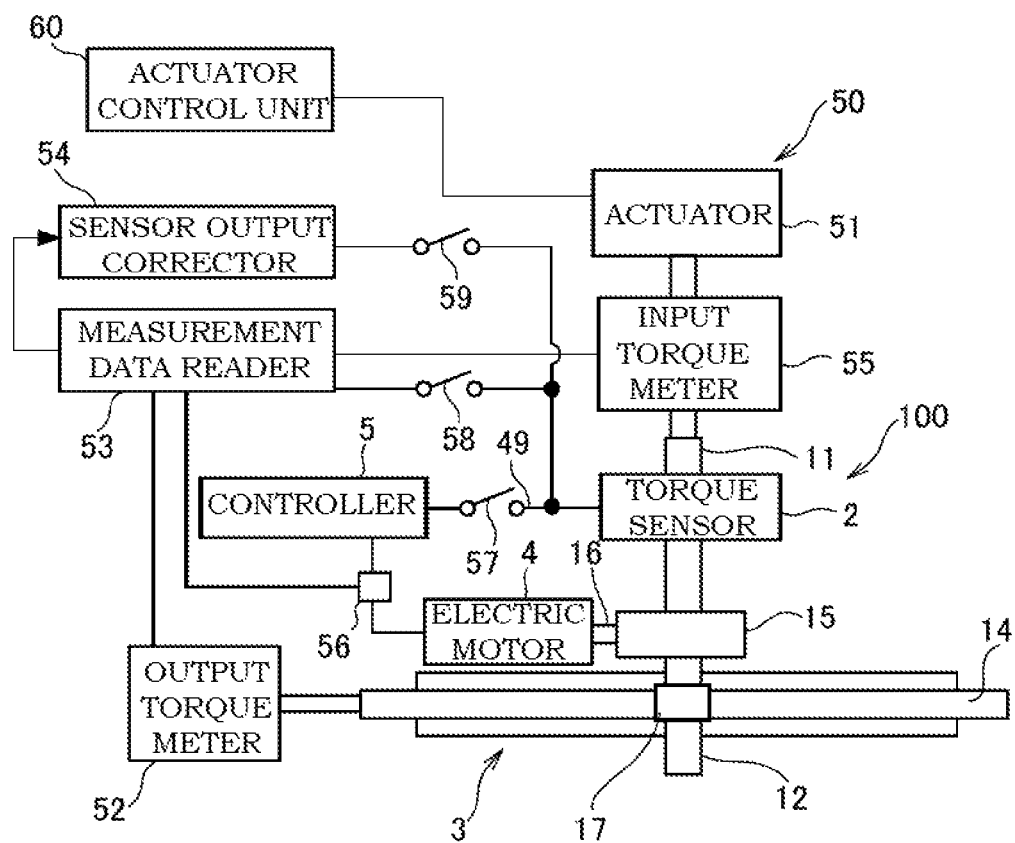
FIG. 5 is a schematic configuration diagram of an adjusting device of the electric power steering device according to the first embodiment of the present invention.

As shown in FIG. 5, the adjusting device 50 includes an actuator 51 for applying an input torque to the input shaft 11, an actuator control unit 60 for controlling the operation of the actuator 51, an input torque meter 55 for measuring the input torque applied to the input shaft 11 by the actuator 51, an output torque meter 52 for measuring a thrust of the rack 14 of the steering mechanism 3 (rack thrust), a measurement data reader 53 for reading measurement data of the input torque meter 55 and the output torque meter 52, and a sensor output corrector 54 for correcting an output signal of the torque sensor 2 in accordance with the measurement data read by the measurement data reader 53.

Further, the adjusting device 50 includes a current meter 56 for measuring a motor drive current output to the electric motor 4 from the controller 5, a switch 57 disposed in the wiring 49 connecting the torque sensor 2 and the controller 5, a switch 58 disposed in a wiring connecting the torque sensor 2 and the measurement data reader 53, and a switch 59 disposed in a wiring connecting the torque sensor 2 and the sensor output corrector 54.

Next, an adjusting method of the electric power steering device 100 by the adjusting device 50 is described with reference to FIG. 6.

In Step 1, an assembling step is performed to assemble the electric power steering device 100 with the adjusting device 50. In the assembling step, the actuator 51 and the input torque meter 55 are mounted on the input shaft 11 and the output torque meter 52 is mounted on the rack 14. Further, the measurement data reader 53 and the sensor output corrector 54 are connected to the torque sensor 2.

In Step 2, a temporary sensor output setting step is performed to temporarily set the output signals of the main sensor and the sub-sensor. In the temporary sensor output setting step, temporary output signals as the output signals corresponding to the input torque are set. That is, temporary output characteristics are set. Further, a temporary output amplification factor and a temporary offset value are respectively set in the amplifying unit and the offset unit in the adjusting unit of the magnetic sensor 48. The temporary output characteristics of the main sensor and the sub-sensor set in the temporary sensor output setting step are set to be opposite to each other. This temporary sensor output setting step may be performed prior to the assembling of the electric power steering device 100 with the adjusting device 50.

In the following Steps, different adjustments are made in the main sensor and the sub-sensor. First, an adjusting method of the main sensor is described.

In Step 31, an input torque measuring step of measuring an input torque applied to the input shaft 11 from the actuator 51 by the input torque meter 55 and an output torque measuring step of measuring an output torque output by the rack 14 by the output torque meter 52 are performed. The input torque measuring step and the output torque measuring step are described in detail below.

A state where an output signal of the main sensor is input to the controller 5 is set by turning on the switch 57 and turning off the switches 58, 59.

The actuator 51 is caused to operate by the actuator control unit 60 and an input torque continuously changing in a predetermined characteristic is applied to the input shaft 11. Specifically, the actuator control unit 60 controls the operation of the actuator 51 so that, after rotating in one direction (e.g. rightward turning direction), the input shaft 11 rotates in the other direction (e.g. leftward turning direction).

The electric power steering device 100 operates by the application of the input torque to the input shaft 11. Specifically, the torsion bar 21 is twisted in accordance with the input torque applied to the input shaft 11 and the main sensor outputs an output signal based on the temporary output characteristic in accordance with the input torque. Then, the controller 5 outputs a motor drive current to the electric motor 4 in accordance with the output signal output from the main sensor and the electric motor 4 applies an assist torque to the steering mechanism 3.

During the operation of the electric power steering device 100, the input torque meter 55 measures the input torque applied to the input shaft 11 from the actuator 51, the output toque meter 52 measures the output torque of the rack 14 and the current meter 56 measures the motor drive current.

The measurement data reader 53 reads and stores each of the measurement data of the input torque of the input shaft 11 measured by the input torque meter 55, the measurement data of the output torque of the rack 14 measured by the output torque meter 52, and the measurement data of the motor drive current measured by the current meter 56.

In Step 32, a sensor output correcting step is performed to correct the output signal of the main sensor by the sensor output corrector 54 so that a relationship between the input torque and the output torque read by the measurement data reader 53 becomes an ideal characteristic set in advance. Specifically, at least one of the output amplification factor set in the amplifying unit and the offset value set in the offset unit in the adjusting unit of the main sensor is corrected. In the sensor output correcting step, a state where a signal output by the sensor output corrector 54 is input to the torque sensor 2 is set by turning on the switch 59 and turning off the switches 57, 58.

The sensor output correcting step is specifically described with reference to FIGS. 7 to 10.

Figure 7:
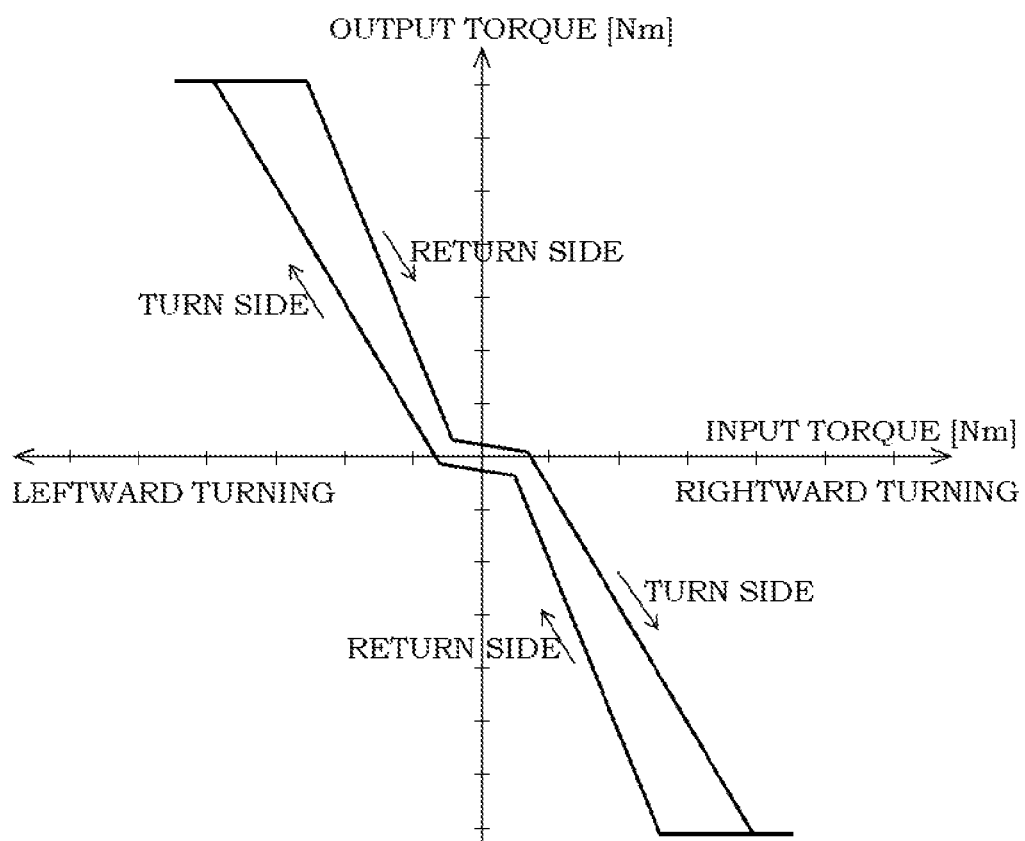
FIG. 7 is an ideal thrust characteristic diagram of the electric power steering device according to the first embodiment of the present invention.

FIG. 7 is an ideal thrust characteristic diagram showing a relationship between the input torque measured by the input torque meter 55 and the output torque measured by the output torque meter 52 and stored in the sensor output corrector 54 in advance. The ideal thrust characteristic is symmetric between leftward turning and rightward turning with a neutral position of the steering wheel as a center as shown. The output torque has a hysteresis component on a turn side and a return side of the steering wheel as shown. This is because the output signal of the torque sensor 2 has a hysteresis component which increases and decreases in accordance with a twist angle of the torsion bar 21 on the turn side and the return side.

Figure 8A:
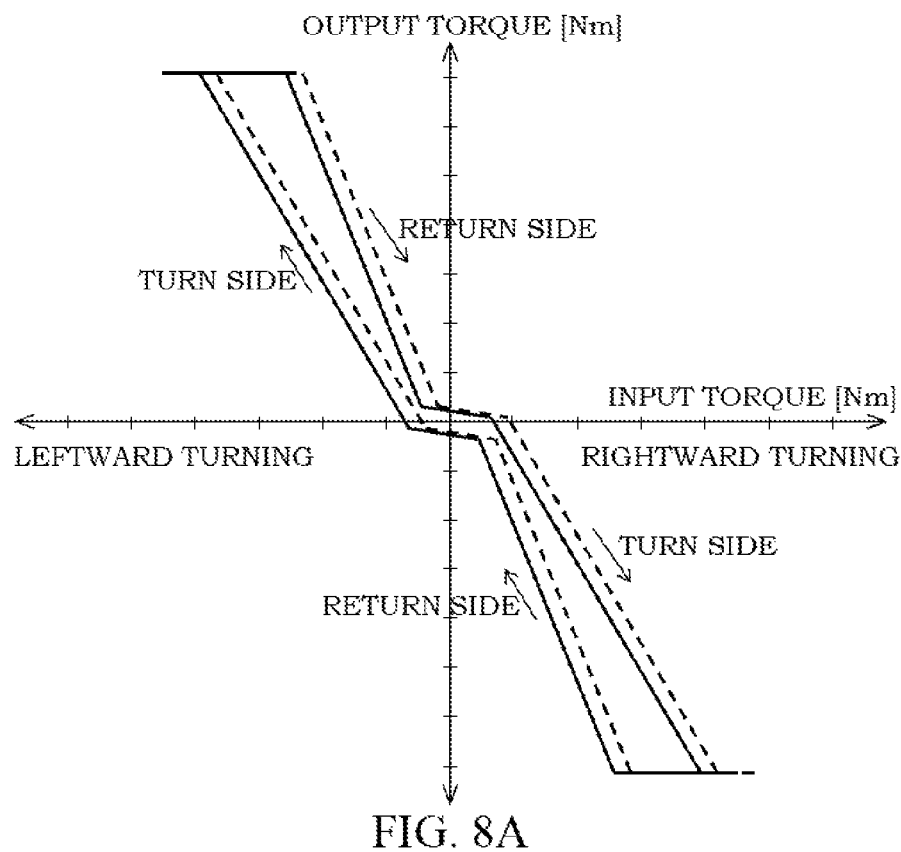
FIG. 8A is a thrust characteristic diagram of the electric power steering device according to the first embodiment of the present invention, dotted line showing a characteristic before a correction and solid line showing a characteristic after the correction.
Figure 9A:
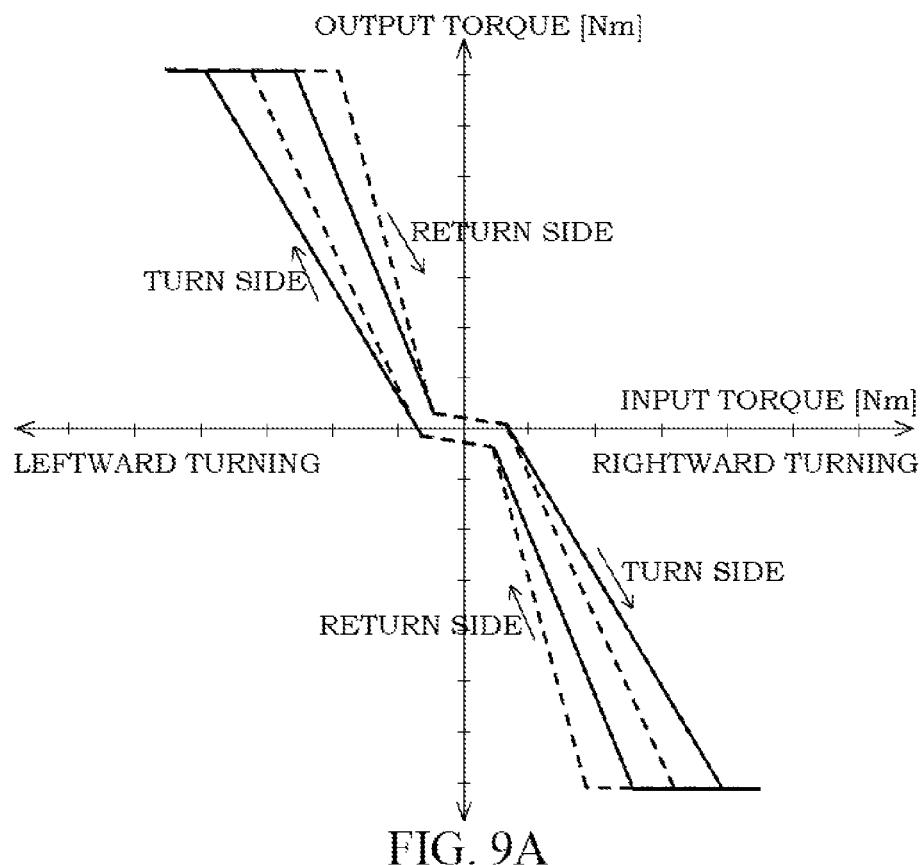
FIG. 9A is a thrust characteristic diagram of the electric power steering device according to the first embodiment of the present invention, dotted line showing a characteristic before a correction and solid line showing a characteristic after the correction.
Figure 10A:
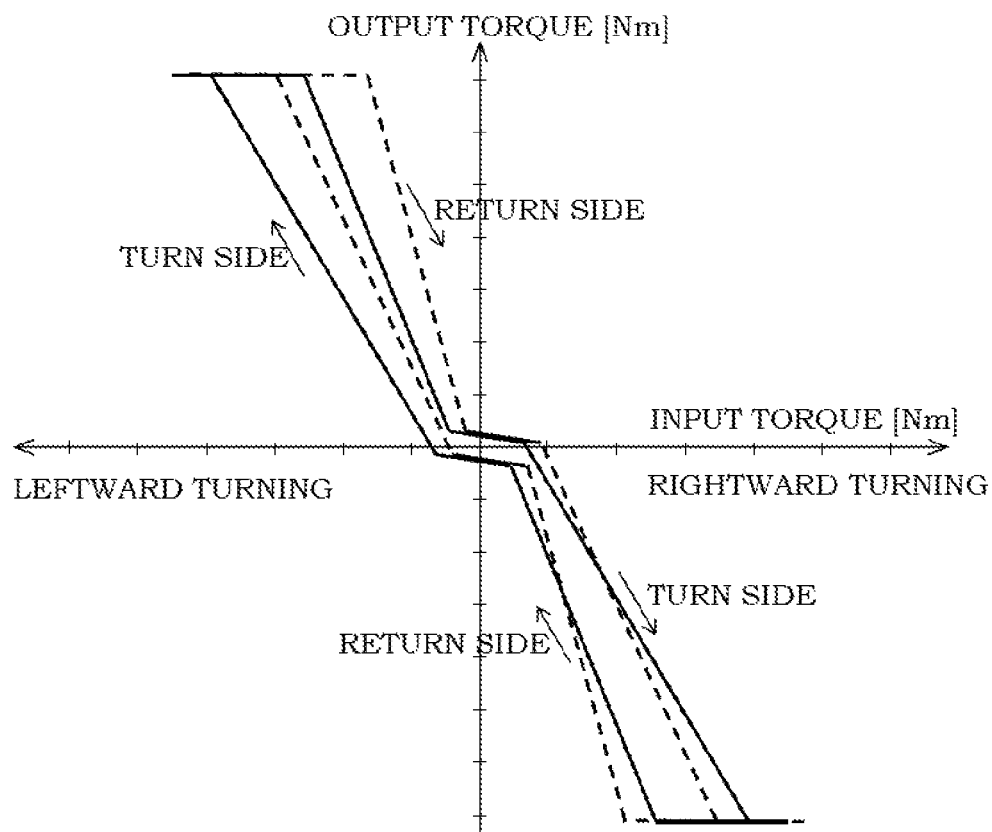
FIG. 10A is a thrust characteristic diagram of the electric power steering device according to the first embodiment of the present invention, dotted line showing a characteristic before a correction and solid line showing a characteristic after the correction.

In the sensor output corrector 54, a measured thrust characteristic shown in dotted line in FIGS. 8A, 9A and 10A is generated on the basis of the measurement data of the input torque and the output torque read by the measurement data reader 53 and compared with the ideal thrust characteristic stored in advance.

FIGS. 8A, 9A and 10A show a case where there is a deviation between the measured thrust characteristic (dotted line) and the ideal thrust characteristic (solid line). The measured thrust characteristic (dotted line) shown in FIGS. 8A, 9A and 10A is a characteristic when the electric motor 4 applies an assist torque to the steering mechanism 3 on the basis of the temporary output characteristic of the main sensor temporarily set in the temporary sensor output setting step of Step 2 and shown in dotted line in FIGS. 8B, 9B and 10B.

FIG. 8A shows a state where the measured thrust characteristic (dotted line) is offset in the rightward turning direction with respect to the ideal thrust characteristic (solid line). FIG. 9A shows a state where a change rate of the measured thrust characteristic (dotted line) is larger than that of the ideal thrust characteristic (solid line). FIG. 10A shows a state where the measured thrust characteristic (dotted line) is offset in the rightward turning direction with respect to the ideal thrust characteristic (solid line) and the change rate of the measured thrust characteristic (dotted line) is larger than that of the ideal thrust characteristic (solid line).

Figure 8B:
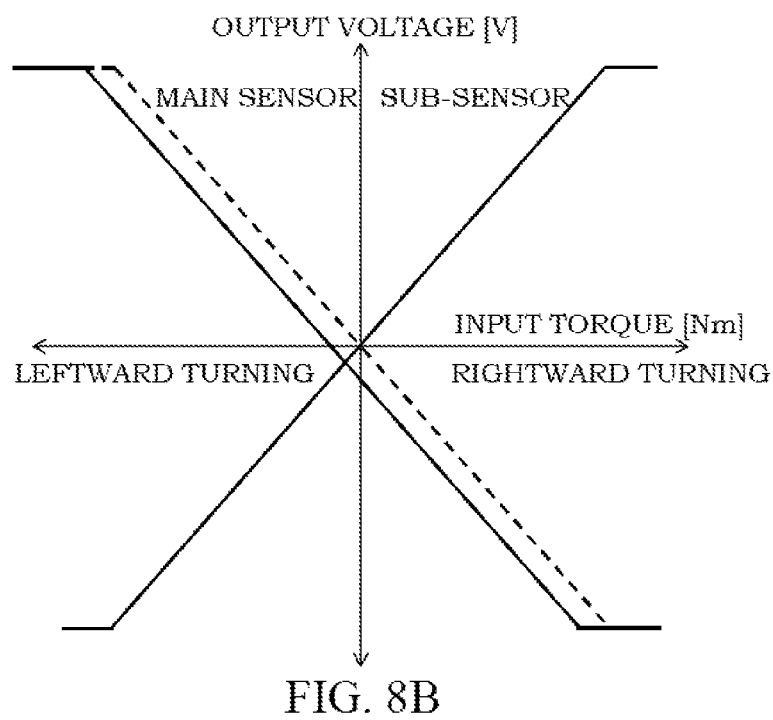
FIG. 8B is an output characteristic diagram of a torque sensor, dotted line showing a characteristic before a correction and solid line showing a characteristic after the correction in a main sensor.
Figure 9B:
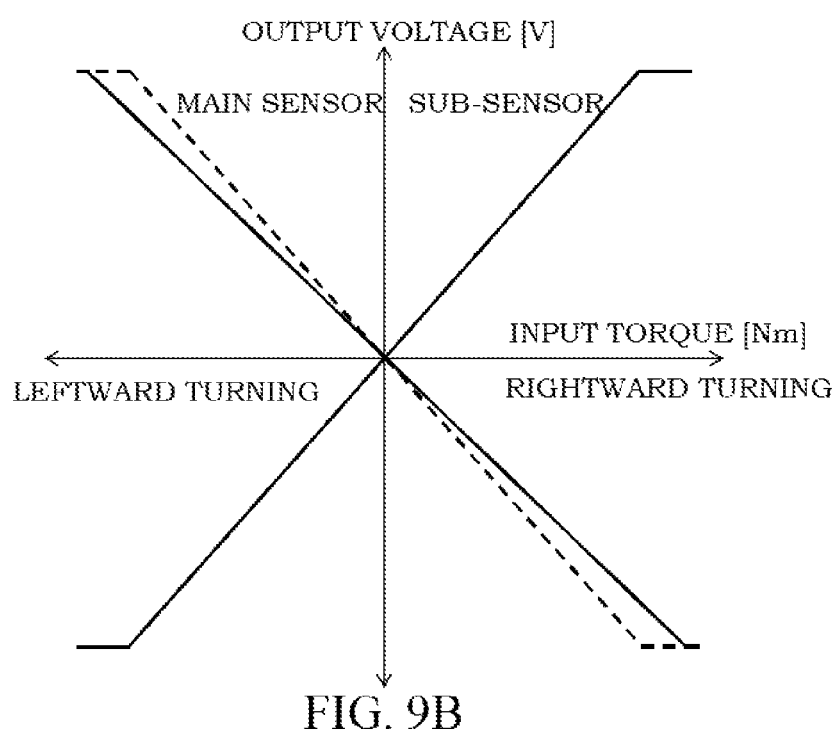
FIG. 9B is an output characteristic diagram of the torque sensor, dotted line showing a characteristic before a correction and solid line showing a characteristic after the correction in the main sensor.
Figure 10B:
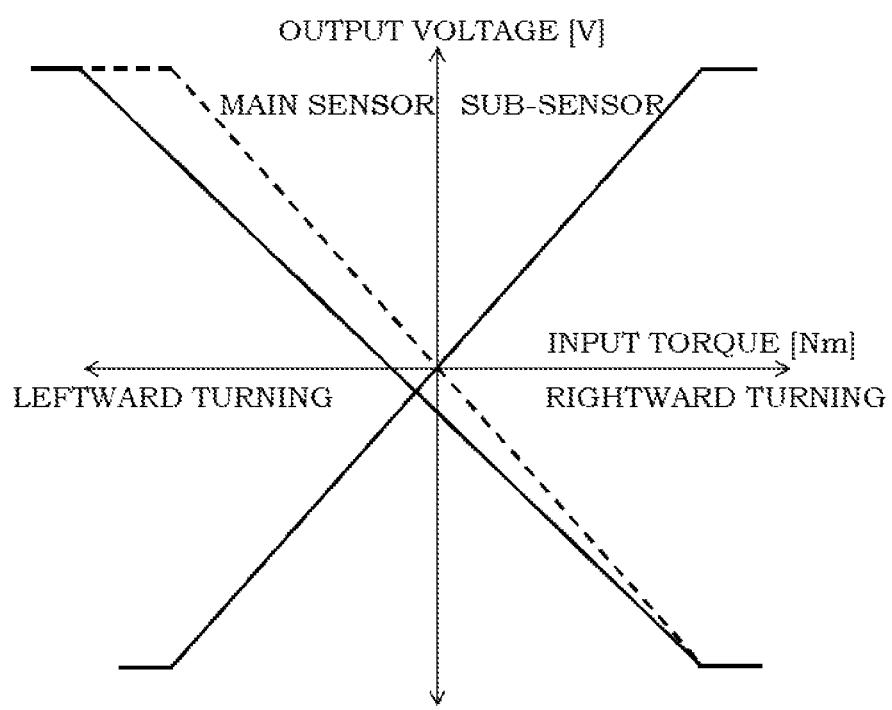
FIG. 10B is an output characteristic diagram of the torque sensor, dotted line showing a characteristic before a correction and solid line showing a characteristic after the correction in the main sensor.

The sensor output corrector 54 corrects the output amplification factor set in the amplifying unit and the offset value set in the offset unit in the adjusting unit of the main sensor so that the measured thrust characteristic (dotted line) coincides with the ideal thrust characteristic (solid line). In FIGS. 8B, 9B and 10B, the output characteristic of the main sensor after a correction is shown in solid line. Specifically, in the case of FIG. 8A, the offset value set in the offset unit is so corrected that the output signal of the main sensor is offset in the leftward turning direction as shown in FIG. 8B. This causes a switch from the characteristic shown in dotted line to the characteristic shown in solid line in FIG. 8A, whereby the ideal characteristic as shown in FIG. 7 is obtained. Further, in the case of FIG. 9A, the output amplification factor set in the amplifying unit is so corrected that the gradient of the output signal of the main sensor becomes smaller as shown in FIG. 9B. This causes a switch from the characteristic shown in dotted line to the characteristic shown in solid line in FIG. 9A, whereby the ideal characteristic as shown in FIG. 7 is obtained. Further, in the case of FIG. 10A, the offset value set in the offset unit is so corrected that the output signal of the main sensor is offset in the leftward turning direction and the output amplification factor set in the amplifying unit is so corrected that the gradient of the output signal of the main sensor becomes smaller as shown in FIG. 10B. This causes a switch from the characteristic shown in dotted line to the characteristic shown in solid line in FIG. 10A, whereby the ideal characteristic as shown in FIG. 7 is obtained.

As described above, the output signal of the main sensor is so corrected that the relationship between the input torque measured by the input torque meter 55 and the output torque measured by the output torque meter 52 becomes the ideal characteristic. Since the assist control is executed using the output signal of the main sensor corrected in this way, control accuracy is enhanced.

Next, an adjusting method of the sub-sensor is described with reference to FIGS. 5 and 6.

In Step 41, an input torque measuring step of measuring the input torque applied to the input shaft 11 from the actuator 51 by the input torque meter 55 and a sensor output measuring step of measuring the input torque detected by the sub-sensor in accordance with the input torque applied to the input shaft 11 from the actuator 51 are performed. The input torque measuring step and the sensor output measuring step are described in detail below.

A state where the input torque detected by the torque sensor 2 is input to the measurement data reader 53 is set by turning on the switch 58 and turning off the switches 57, 59.

The actuator 51 is caused to operate by the actuator control unit 60 and an input torque continuously changing in a predetermined characteristic is applied to the input shaft 11. Specifically, the actuator control unit 60 controls the operation of the actuator 51 so that, after rotating in one direction (e.g. rightward turning direction), the input shaft 11 rotates in the other direction (e.g. leftward turning direction).

During the operation of the actuator 51, the input torque meter 55 measures the input torque applied to the input shaft 11 from the actuator 51 and the sub-sensor outputs an output signal based on the temporary output characteristic in accordance with the input torque applied to the input shaft 11 from the actuator 51.

The measurement data reader 53 reads and stores each of the measurement data of the input torque of the input shaft 11 measured by the input torque meter 55 and the input torque detected on the basis of the output signal of the sub-sensor.

In Step 42, a sensor output correcting step is performed to correct the output signal of the sub-sensor by the sensor output corrector 54 so that the input torque detected by the sub-sensor coincides with the input torque measured by the input torque meter 55. Specifically, at least one of the output amplification factor set in the amplifying unit and the offset value set in the offset unit in the adjusting unit of the sub-sensor is corrected. In the sensor output correcting step, a state where a signal output by the sensor output corrector 54 is input to the torque sensor 2 is set by turning on the switch 59 and turning off the switches 57, 58.

As described above, the output signal of the sub-sensor is so corrected that the input torque detected by the sub-sensor coincides with the input torque measured by the input torque meter 55. Thus, the output signal of the sub-sensor correctly reflects an actual input torque. Since the controls other than the assist control are executed using the output signal of the sub-sensor corrected in this way, control accuracy is enhanced.

The corrected output characteristics of the main sensor and the sub-sensor obtained by the adjusting device 50 are recorded with a recognition number for each magnetic sensor 48. This recorded data is used also at the time of an output adjustment made when the magnetic sensor 48 is exchanged.

The output signal of the main sensor used in the assist control is corrected on the basis of the output torque of the steering mechanism 3 and the output signal of the sub-sensor used in the controls other than the assist control is corrected on the basis of the input torque applied to the input shaft 11. Since the output signals of the main sensor and the sub-sensor are separately corrected to be suitable for each control, the accuracy of both the assist control and the controls other than the assist control can be enhanced.

Figure 11:
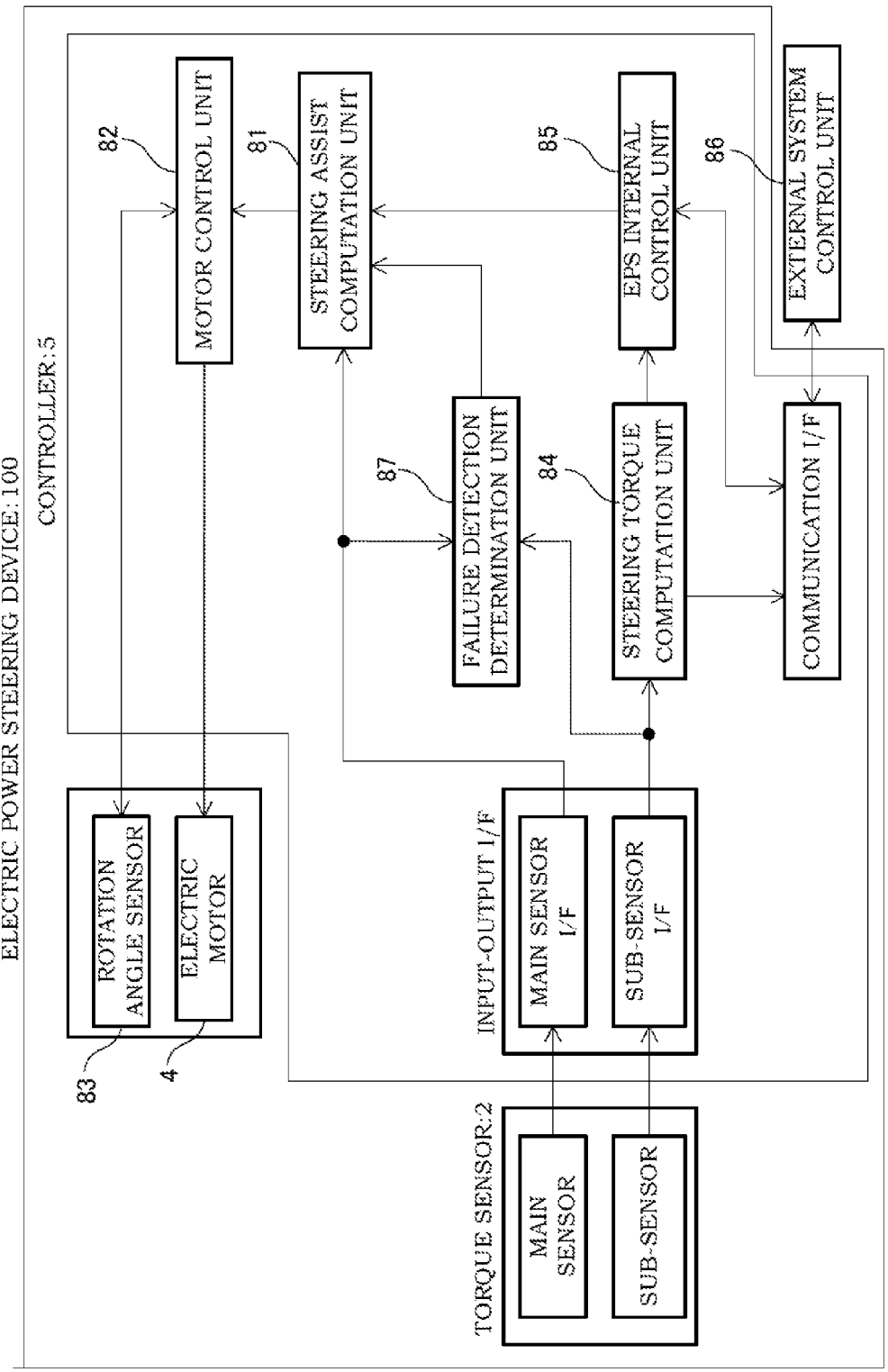
FIG. 11 is a system configuration diagram of the electric power steering device according to the first embodiment of the present invention.

Next, a control of the electric power steering device 100 using the output signals of the main sensor and the sub-sensor is described with reference to FIG. 11.

The output signal of the main sensor corrected on the basis of the output torque of the steering mechanism 3 and that of the sub-sensor corrected on the basis of the input torque are respectively input to the controller 5 via a main sensor I/F and a sub-sensor I/F.

The output signal of the main sensor is output to a steering assist computation unit 81. The steering assist computation unit 81 computes an assist direction and an assist amount on the basis of the output signal of the main sensor and outputs a command signal to a motor control unit 82. The motor control unit 82 controls the drive of the electric motor 4 on the basis of a detection result of a rotation angle sensor 83 for detecting a rotation angle of the motor. As just described, the assist control for assisting the steering of the steering wheel by the driver is executed on the basis of the output signal of the main sensor.

The output signal of the sub-sensor is output to a steering torque computation unit 84. The steering torque computation unit 84 converts the output signal of the sub-sensor into input torque information. Then, the input torque information is output to an EPS internal control unit 85 in the electric power steering device 100 and output to an external system control unit 86 outside the electric power steering device 100 via a communication I/F. The EPS internal control unit 85 is for executing the controls other than the assist control, e.g. a flutter suppression control. In that case, the EPS internal control unit 85 computes a control amount for suppressing a flutter phenomenon of the vehicle on the basis of the input torque information from the steering torque computation unit 84 and outputs it to the steering assist computation unit 81. The steering assist computation unit 81 adds the control amount computed on the basis of the output signal of the sub-sensor to the assist amount computed on the basis of the output signal of the main sensor and outputs a command signal to the motor control unit 82 on the basis of that addition value.

The external system control unit 86 is for executing the controls other than the assist control and executes the control for maintaining the traveling stability of the vehicle on the basis of the input torque information from the steering torque computation unit 84.

A failure detection determination unit 87 determines whether or not the main sensor is broken down on the basis of a comparison between the output signal of the main sensor and that of the sub-sensor and outputs a determination result to the steering assist computation unit 81. The steering assist computation unit 81 outputs a command signal to the motor control unit 82 to stop the assist control if the determination result to the effect that the main sensor is broken down is input from the failure detection determination unit 87. The failure detection determination unit 87 determines that the main sensor is broken down if a difference between the output signal of the main sensor and that of the sub-sensor is determined to be not smaller than a predetermined permissible difference. Here, since the output signal of the main sensor and that of the sub-sensor are separately corrected, they do not have output characteristics opposite to each other. Thus, the above permissible difference needs to be determined in consideration of each correction amount.

According to the above embodiment, the following effects are exhibited.

As described above, the assist control is executed on the basis of the output signal of the main sensor corrected on the basis of the output torque of the steering mechanism 3. The controls other than the assist control are executed on the basis of the output signal of the sub-sensor corrected on the basis of the input torque. Since the output signal of the main sensor used in the assist control and that of the sub-sensor used in the controls other than the assist control are separately corrected to be suitable for each control as just described, the accuracy of both the assist control and the controls other than the assist control can be enhanced.

Modifications of the above first embodiment are described below.

(1) In the above first embodiment, the output torque meter 52 has been described to measure the thrust of the rack 14. However, the thrust measured by the output torque meter 52 may be a thrust of any part provided that it is a thrust after the assist torque by the electric motor 4 of the steering mechanism 3 is applied. For example, a thrust of the output shaft 12 may be measured.

(2) In the above embodiment, the output signal of the main sensor has been described to be corrected on the basis of the output torque of the steering mechanism 3. Instead of this, the output signal of the main sensor may be corrected on the basis of the input torque applied to the input shaft 11 similarly to the sub-sensor and, thereafter, corrected on the basis of the output torque of the steering mechanism 3. That is, the output signal of the main sensor has only to be finally corrected on the basis of the output torque of the steering mechanism 3.

(3) In the above embodiment, the input torque has been described to be applied to the input shaft 11 using the actuator. Instead of this, an input torque may be manually applied to the input shaft 11.

<Second Embodiment>

Figure 12:
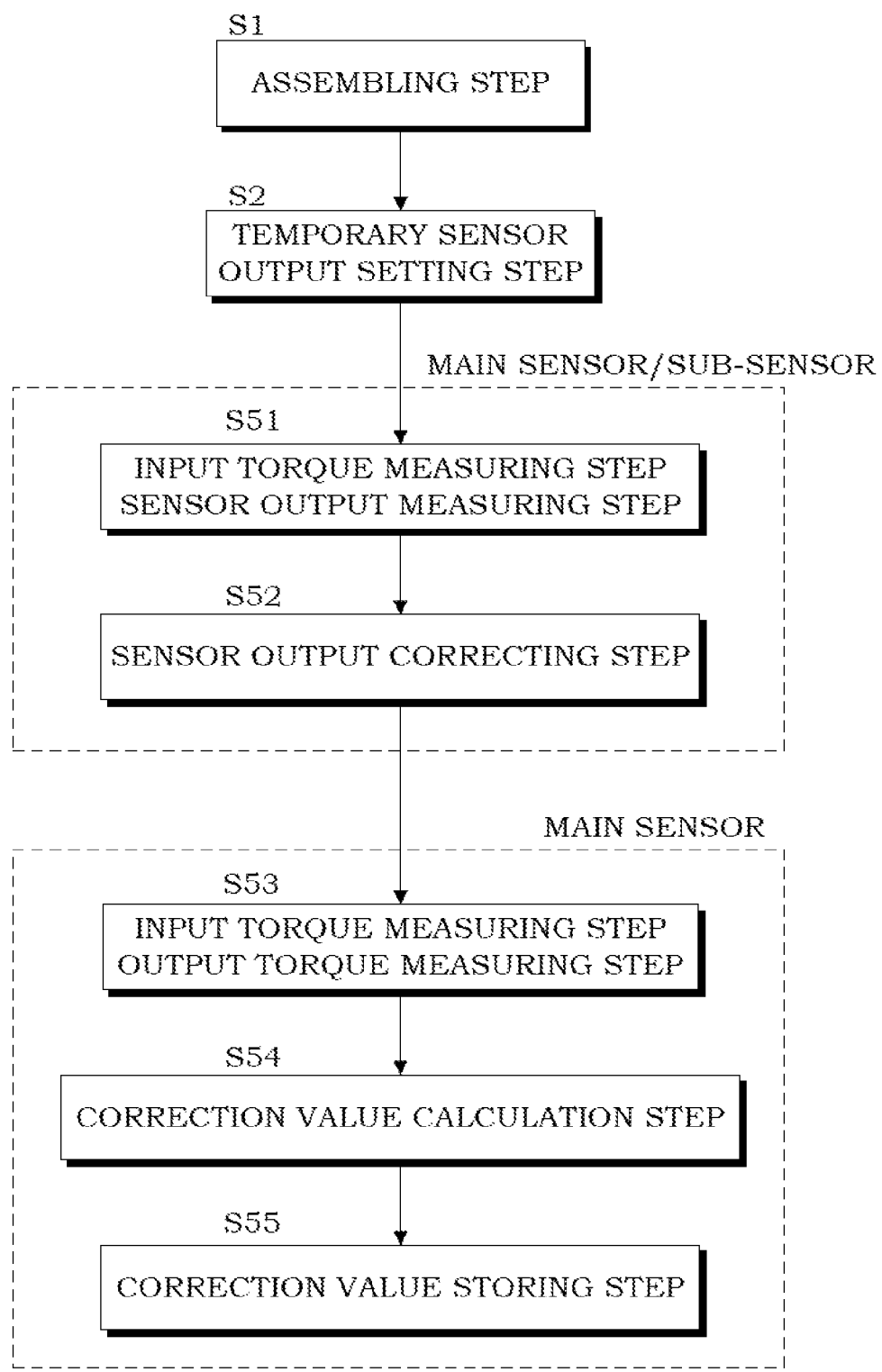
FIG. 12 is a flow chart showing the procedure of an adjusting method of an electric power steering device according to a second embodiment of the present invention.
Figure 13:
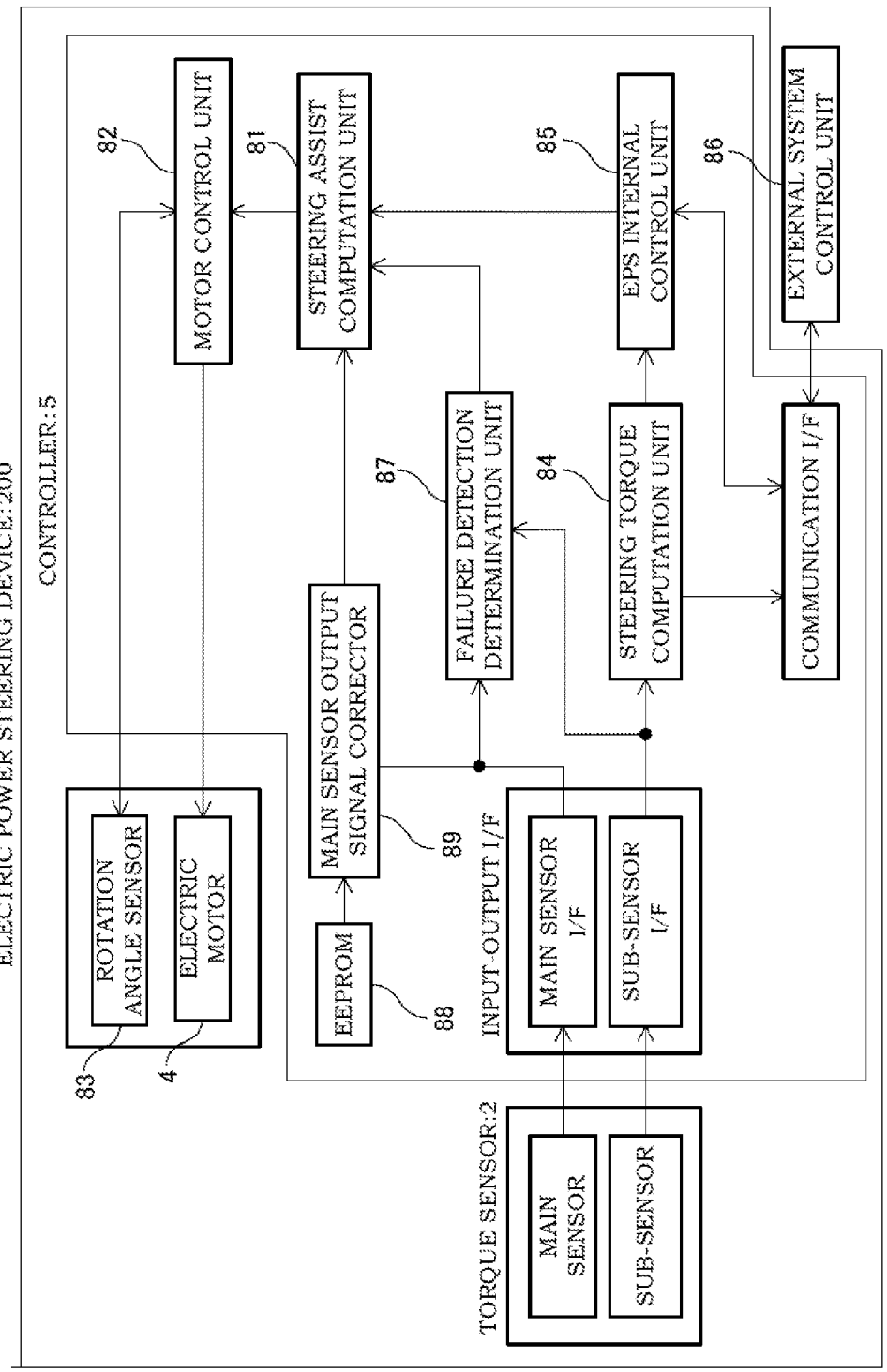
FIG. 13 is a system configuration diagram of the electric power steering device according to the second embodiment of the present invention.

Next, an electric power steering device 200 according to a second embodiment of the present invention is described with reference to FIGS. 12 and 13. Points of difference from the above first embodiment are described below. The same components and steps of the same processes as in the first embodiment are denoted by the same reference sings and step numbers and are not described.

An adjusting method of the electric power steering device 200 by an adjusting device 50 is described with reference to FIG. 12.

Figure 6:
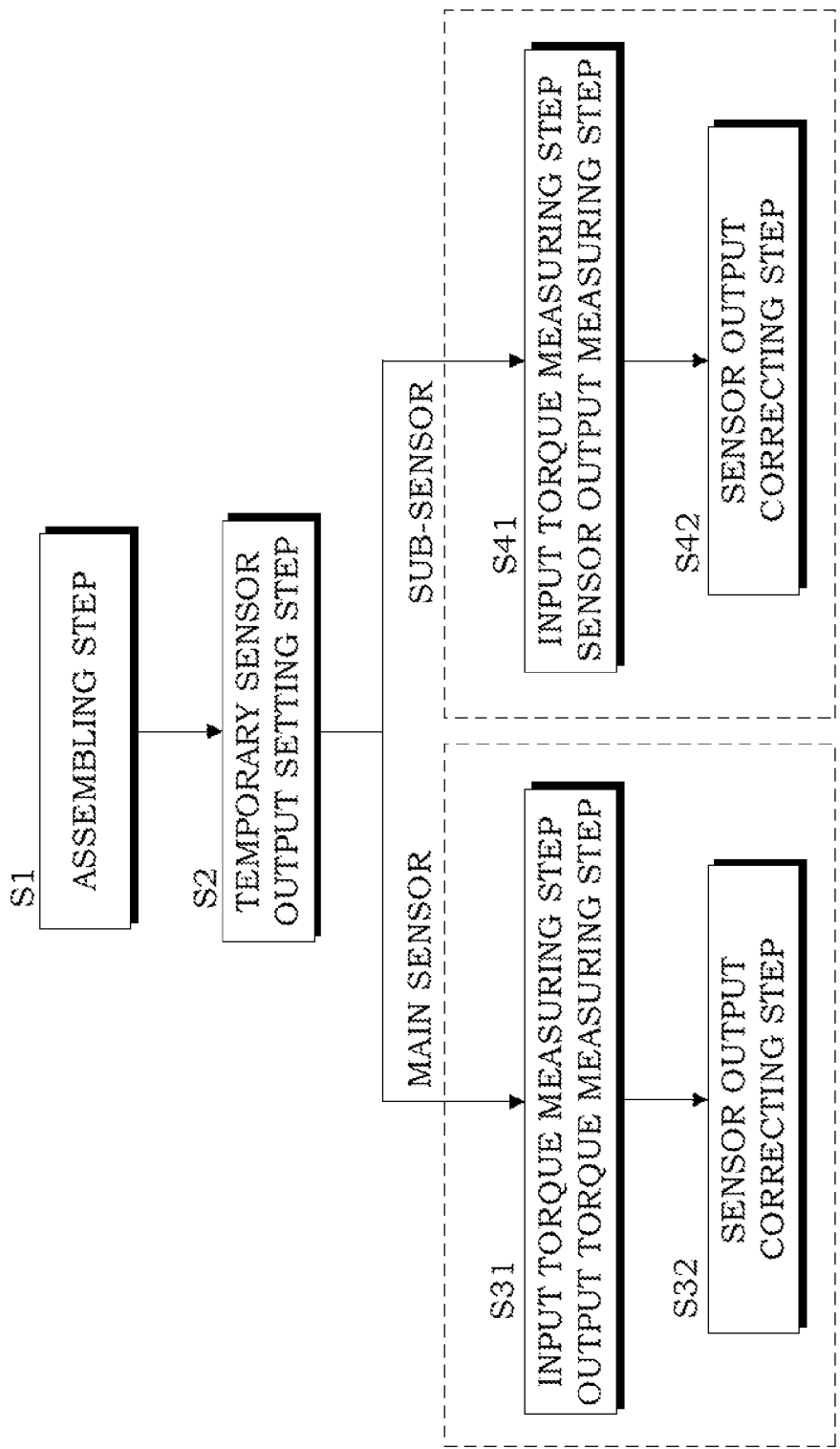
FIG. 6 is a flow chart showing the procedure of an adjusting method of the electric power steering device according to the first embodiment of the present invention.

Steps 1 and 2 are the same processes as the above first embodiment (FIG. 6).

Steps 51 and 52 are the same processes as Steps 41 and 42 in the above first embodiment (FIG. 6). A difference from the first embodiment lies in that the processes only for the sub-sensor are performed in Steps 41 and 42 of the above first embodiment, whereas processes for both the main sensor and the sub-sensor are performed in Steps 51 and 52. That is, in Steps 51 and 52, an output signal of a main sensor is so corrected by a sensor output corrector 54 that an input torque detected by the main sensor coincides with an input torque measured by an input torque meter 55 and an output signal of a sub-sensor is so corrected by the sensor output corrector 54 that an input torque detected by the sub-sensor coincides with the input torque measured by the input torque meter 55.

Step 53 is the same process as Step 31 of the above first embodiment (FIG. 6).

In Step 54, a correction value calculation step is performed to calculate a correction value for correcting the output signal of the main sensor so that a relationship between an input torque and an output torque read by a measurement data reader 53 becomes an ideal characteristic set in advance. The correction value is a value for amplifying and offsetting the output signal of the main sensor. The correction value is calculated in a method similar to that in Step 32 of the above first embodiment (FIG. 6). The correction value may be calculated by the sensor output corrector 54 (FIG. 5) or by a controller 5.

In Step 55, a correction value storing step is performed to store the correction value calculated in Step 54 in an EEPROM 88 (see FIG. 13) as a correction value storage of the controller 5. The EEPROM 88 is a nonvolatile memory for holding memories even if the supply of power to the controller 5 is cut off.

As just described, in the above first embodiment, the output amplification factor set in the amplifying unit and the offset value set in the offset unit in the adjusting unit of the main sensor are so corrected that the relationship between the input torque and the output torque read by the measurement data reader 53 becomes the ideal characteristic set in advance. Contrary to this, in this second embodiment, the correction value for correcting the output signal of the main sensor so that the relationship between the input torque and the output torque read by the measurement data reader 53 becomes the ideal characteristic set in advance is calculated and stored in the EEPROM 88 of the controller 5.

Next, a control of the electric power steering device 200 using the output signals of the main sensor and the sub-sensor is described with reference to FIG. 13.

The output signal of the main sensor and that of the sub-sensor input to the controller 5 via a main sensor I/F and a sub-sensor I/F are both signals corrected on the basis of the input torque.

The output signal of the main sensor is corrected by a main sensor output signal corrector 89. The main sensor output signal corrector 89 corrects the output signal of the main sensor using the correction value stored in the EEPROM 88 and outputs it to a steering assist computation unit 81. As just described, the output signal of the main sensor is corrected on the basis of the correction value stored in the EEPROM 88 of the controller 5. Thus, the output signal of the main sensor input to the steering assist computation unit 81 is corrected on the basis of the output torque of the steering mechanism 3.

As just described, this second embodiment differs from the above first embodiment in that the correction of the output signal of the main sensor on the basis of the output torque of the steering mechanism 3 is made in the controller 5.

A failure detection determination unit 87 determines that the main sensor is broken down if a difference between the output signal of the main sensor and that of the sub-sensor is determined to be not smaller than a predetermined permissible difference. In this second embodiment, the output signal of the main sensor and that of the sub-sensor input to the failure detection determination unit 87 are both signals corrected on the basis of the input torque and have output characteristics opposite to each other. Thus, unlike the above first embodiment, the above permissible difference needs not be determined in consideration of a correction amount.

Also in this second embodiment, functions and effects similar to the above first embodiment are exhibited.

Embodiments of this invention were described above, but the above embodiments are merely examples of applications of this invention, and the technical scope of this invention is not limited to the specific constitutions of the above embodiments.

This application claims priority based on Japanese Patent Application No. 2013-040969 filed with the Japan Patent Office on Mar. 1, 2013, the entire contents of which are incorporated into this specification.

The invention claimed is:

1. An electric power steering device, comprising:
an input shaft to which an input torque is applied from a steering wheel;
a torque sensor that detects the input torque;
a steering mechanism that transmits the input torque to wheels;
an electric motor that applies an assist torque to the steering mechanism; and
a controller that generates a first output signal by applying a first correction to the input torque and controls the electric motor on the basis of the first output signal while generating a second output signal by applying a second correction to the input torque and outputting the second output signal to a device other than the electric motor;
wherein the first correction corresponds to a correction of the input torque that makes a relation between an actual input torque of the input shaft that is measured independently from the torque sensor and an output torque output by the steering mechanism coincide with a set characteristic, and the second correction corresponds to a correction of the input torque that makes the torque detected by the torque sensor coincide with the actual input torque.

2. The electric power steering device according to claim 1, wherein:
the controller includes a correction value storage that stores a correction value for the first correction; and
the controller applies the first correction to the input torque using the correction value to generate the first output signal.

3. The electric power steering device according to claim 1, wherein:
the torque sensor includes an adjusting unit that includes:

an amplifying unit that amplifies the input torque on the basis of a set output amplification factor, and an offset unit that adds a set offset value to the input torque, and the first correction is performed using at least one of the amplifying unit and the offset unit.

4. An adjusting device of an electric power steering device, the electric power steering device comprising:
- an input shaft to which an input torque is applied from a steering wheel;
- a torque sensor that detects the input torque;
- a steering mechanism that transmits the input torque to wheels;
- an electric motor that applies an assist torque to the steering mechanism; and
- a controller that generates a first output signal by applying a first correction to the input torque and controls the electric motor on the basis of the first output signal while generating a second output signal by applying a second correction to the input torque and outputting the second output signal to a device other than the electric motor, the adjusting device comprising:
- an input torque meter that measures an actual input torque of the input shaft independently from the torque sensor;
- an output torque meter that measures an output torque output by the steering mechanism; and
- a sensor output corrector that
  - determines a correction value for the first correction so that a relationship between the actual input torque measured by the input torque meter and the output torque measured by the output torque meter coincides with a set characteristic; and
  - determines a correction value for the second correction so that the input torque detected by the torque sensor coincides with the actual input torque measured by the input torque meter.

5. The adjusting device of the electric power steering device according to claim 4, wherein:

the torque sensor includes an adjusting unit that includes:
- an amplifying unit that amplifies the input torque on the basis of a set output amplification factor, and
- an offset unit that adds a set offset value to the input torque; and the first correction is performed using at least one of the amplifying unit and the offset unit.

6. An adjusting method of an electric power steering device, the electric power steering device comprising:
- an input shaft to which an input torque is applied from a steering wheel;
- a torque sensor that detects the input torque;
- a steering mechanism that transmits the input torque to wheels;
- an electric motor that applies an assist torque to the steering mechanism; and
- a controller that generates a first output signal by applying a first correction to the input torque and controls the electric motor on the basis of the first output signal while generating a second output signal by applying a second correction to the input torque and outputting the second output signal to a device other than the electric motor, the adjusting method comprising:
- an input torque measuring step of measuring an actual input torque independently from the torque sensor;
- an output torque measuring step of measuring an output torque output by the steering mechanism;
- a first determining step of determining a correction value for the first correction so that a relationship between the actual input torque measured in the input torque measuring step and the output torque measured in the output torque measuring step coincides with a set characteristic; and
- a second determining step of determining a correction value for the second correction so that the input torque detected by the torque sensor coincides with the actual input torque measured in the input torque measuring step.

* * * * *